US009050953B2

(12) United States Patent
Kueperkoch

(10) Patent No.: US 9,050,953 B2
(45) Date of Patent: Jun. 9, 2015

(54) DETERMINING THE VEHICLE LINEAR VELOCITY IN VEHICLES HAVING ALL-WHEEL DRIVE

(75) Inventor: Stefan Kueperkoch, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 949 days.

(21) Appl. No.: 12/228,299

(22) Filed: Aug. 11, 2008

(65) Prior Publication Data

US 2009/0048754 A1 Feb. 19, 2009

(30) Foreign Application Priority Data

Aug. 14, 2007 (DE) ......................... 10 2007 038 398

(51) Int. Cl.
*B60T 7/12* (2006.01)
*B60T 8/172* (2006.01)

(52) U.S. Cl.
CPC ............. *B60T 8/172* (2013.01); *B60T 2250/04* (2013.01)

(58) Field of Classification Search
CPC ............................. B60T 8/172; B60T 2250/04
USPC ............ 701/74, 75, 81, 89, 90; 303/143, 144, 303/170, 171, 173; 702/148
See application file for complete search history.

(56) References Cited

U.S. PATENT DOCUMENTS 5,362,139 A * 11/1994 Watanabe ..................... 303/186
5,719,770 A * 2/1998 Matsuno ......................... 701/71
6,370,467 B1 * 4/2002 Kimbrough ..................... 701/71
6,510,372 B1 * 1/2003 Zenzen et al. .................. 701/70
6,611,781 B1 * 8/2003 Gutmann ...................... 702/148
6,659,570 B2 * 12/2003 Nakamura .................... 303/146
2002/0007243 A1 * 1/2002 Yamaguchi ..................... 701/89

* cited by examiner

*Primary Examiner* — Thomas G Black
*Assistant Examiner* — Peter D Nolan
(74) *Attorney, Agent, or Firm* — Kenyon & Kenyon LLP

(57) ABSTRACT

A method for determining the vehicle linear velocity of a vehicle having all-wheel drive, and which is equipped with a central lock and a vehicle controller to implement an ABS or ASR control. The vehicle linear velocity is able to be determined if a braking-pressure difference is adjusted at the wheels of an axle, and, in the case of an ABS control, the vehicle linear velocity is determined from the rotational speed of the wheel having the higher speed, and from the slip of this wheel, and, in the case of an ASR control, it is determined from the rotational speed of the wheel having the lower speed, and from the slip of this wheel.

17 Claims, 3 Drawing Sheets

DETERMINING THE VEHICLE LINEAR VELOCITY IN VEHICLES HAVING ALL-WHEEL DRIVE

CROSS REFERENCE

This application claims the benefit under 35 U.S.C. §119 of German Patent Application No. 102007038398.5 filed on Aug. 14, 2007, the entirety of which is expressly incorporated herein by reference.

FIELD OF THE INVENTION

The present invention relates to a method and control device for determining the vehicle linear velocity of a vehicle having all-wheel drive.

BACKGROUND INFORMATION

Modern vehicles are often equipped with vehicle controllers which assist the driver in certain driving situations such as during braking, accelerating, or in critical driving situations. Among such controls are, for example, anti-lock braking systems (ABS), traction controls (TCS/ASR) or vehicle-dynamics controllers (e.g., ESP). These systems usually determine the vehicle linear velocity from the rotational speed of the individual wheels. The speed estimated in this manner is normally used to calculate setpoint values for specific vehicle variables such as a setpoint yaw rate, for example.

During a control intervention, e.g., in an ABS situation, the wheel speeds can deviate heavily from the vehicle velocity. In an ABS situation, because of the brake slip, the wheel speeds are usually considerably lower than the corresponding actual vehicle velocity. In such situations the vehicle linear velocity can be determined only inadequately. In vehicles having two-wheel drive it is possible that one of the wheels is underbraked so that it basically rotates freely, and to use the rotational speed of the underbraked wheel to calculate the vehicle linear velocity. However, this is not an option in the case of vehicles with all-wheel drive and equipped with a center lock since all wheels of the vehicle are linked to one another in terms of power via the center lock, and the front wheels thus have a retroactive effect on the wheels of the rear axle and vice versa. It is therefore impossible to exempt an individual wheel independently of the others. During an ABS braking operation, the linear velocity of a vehicle having all-wheel drive with a center lock can thus be determined only inadequately.

SUMMARY

An object of the present invention is to provide a method and device by which the vehicle linear velocity of vehicles having all-wheel drive is able to be determined as precisely as possible even during an ABS or ASR control.

An aspect of the present invention is that a specific braking-pressure difference is adjusted at the two diametrically opposed wheels of an axle, and, in the case of an ABS control, the vehicle linear velocity is calculated based on the wheel speed (or a corresponding proportional variable such as, e.g., the rotational wheel speed) of the particular wheel having the higher speed, and on the wheel slip of this wheel; and in the case of an ASR control, the vehicle linear velocity is calculated based on the wheel speed (or a corresponding proportional variable such as, e.g., the rotational wheel speed) of the particular wheel having the lower speed, and on the slip (λ) of this wheel. The wheel slip used in the calculation is the stationary or quasi-stationary wheel slip at which the change in slip is of equal magnitude (preferably zero) at the diametrically opposed wheels, or at which the slip of both wheels remains constant. This makes it possible to determine the linear velocity without an additional sensor system.

According to one preferred specific embodiment of the present invention, an algorithm calculates vehicle linear velocity $v_x$ according to:

$$v_x = \frac{V}{1-\lambda}, \quad (1)$$

λ being the stationary wheel slip of the wheel having the higher speed (in an ABS control), or the lower speed (in an ASR control), and v being the wheel speed of this wheel. The following applies in connection with the wheel speed: v=2rπn, n being the wheel speed.

To generate the desired braking-force difference or pressure difference, the braking pressure is basically able to be increased or decreased at each individual wheel. It may be sufficient to vary the braking pressure at one of the two wheels. According to one special specific embodiment of the present invention, it is also possible, however, to increase the braking pressure at one wheel and to decrease it at the other wheel of the same axle.

Stationary wheel slip λ is preferably determined by a special method with the aid of tire characteristic fields for different coefficients of friction of the road. In this context, both real and simplified tire characteristic curves are preferably utilized.

The two wheels at which the pressure difference is adjusted are preferably excluded from the control in a driving situation during which the controller is active. Thus, they are not influenced by the controller so that the vehicle linear velocity is able to be calculated without adverse effect on the controller.

The wheels of the rear axle are preferably able to be used to determine the vehicle linear velocity since they tend to have a lower vertical tire force. The front wheels are mostly used to decelerate the vehicle or to exert a yawing moment about the vertical axis. Depending on the driving situation, however, the wheels of the front axle may also be used to determine the vehicle velocity. An alternating application of the method to front and rear axle is possible as well.

The braking-force difference or the pressure difference at the two wheels is preferably selected so low that no relevant yawing moment occurs about the vertical axis of the vehicle and the vehicle thus remains stable.

On the other hand, the force- or pressure difference at the two wheels is preferably selected high enough to overcome the friction of the axle differential. Otherwise, the two wheels would possibly continue to run at the same speed and the measure would show no effect.

In a vehicle having a hydraulic brake system, the pressure difference (depending on braking coefficient cp) at a low coefficient of friction (e.g., a smooth road surface) preferably amounts to less than 20 bar and approximately 10 bar, in particular. These values are highly dependent upon the vehicle, however. With higher coefficients of friction, higher pressure differences may be applied. On road surfaces having different coefficients of friction (μ-split), it is also possible to select a very small pressure difference or it may amount to zero, for example.

The afore-described function is preferably implemented only when the center lock of the 4×4 vehicle is in the locked state. Furthermore, it is preferably applied only at axles where an axle differential gearing is provided.

Upon each implementation of the algorithm according to the present invention, a slight yawing moment is produced about the vertical axis of the vehicle. To limit this yawing rate, a regular reversal of the operational sign of the force or pressure difference is provided, i.e., the braking force or braking pressure is alternately reduced or increased at one and then at the diametrically opposed wheel. The yawing moment thus remains approximately zero, at least on average over time.

According to one special specific embodiment, the force or pressure difference may also be regulated or be temporally variable (e.g., have a ramp shape).

The algorithm according to the present invention is preferably integrated into a control device, which is linked to one or a plurality of actuator(s) such as, for example, the valves of a hydraulic brake system or electro motors of an electromechanical brake system, and controls them appropriately.

BRIEF DESCRIPTION OF THE DRAWINGS

In the following text, the present invention is explained in greater detail by way of example, with reference to the figures.

F*ig*. 3 shows a model of the μ-slip curve used to determine the wheel slip.

Figure 4:
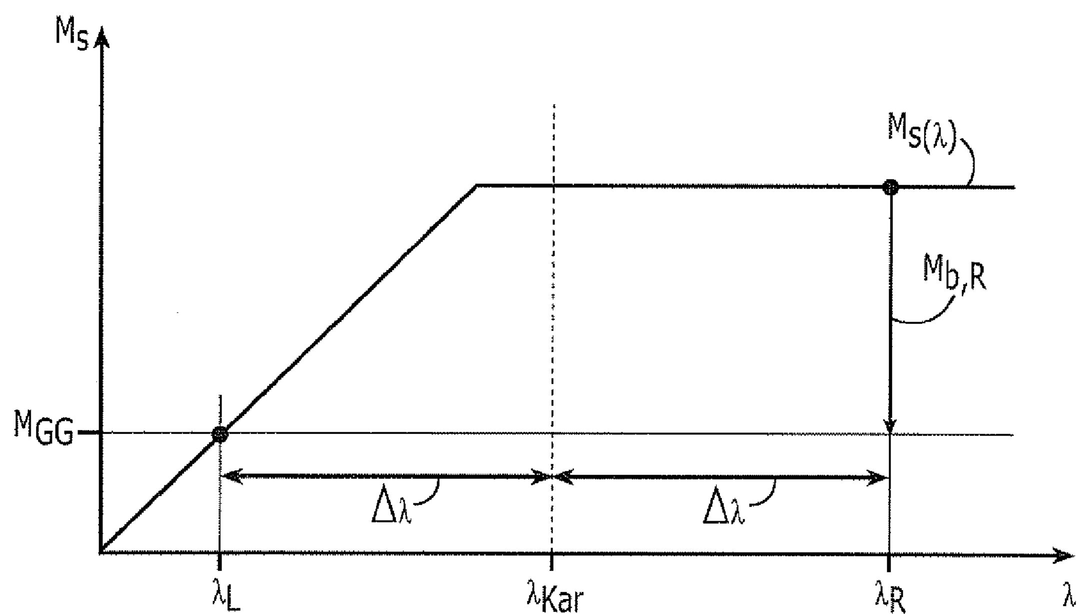

FIG. 4 shows a model of the M-slip curve used to determine the stationary slip.

Figure 5:
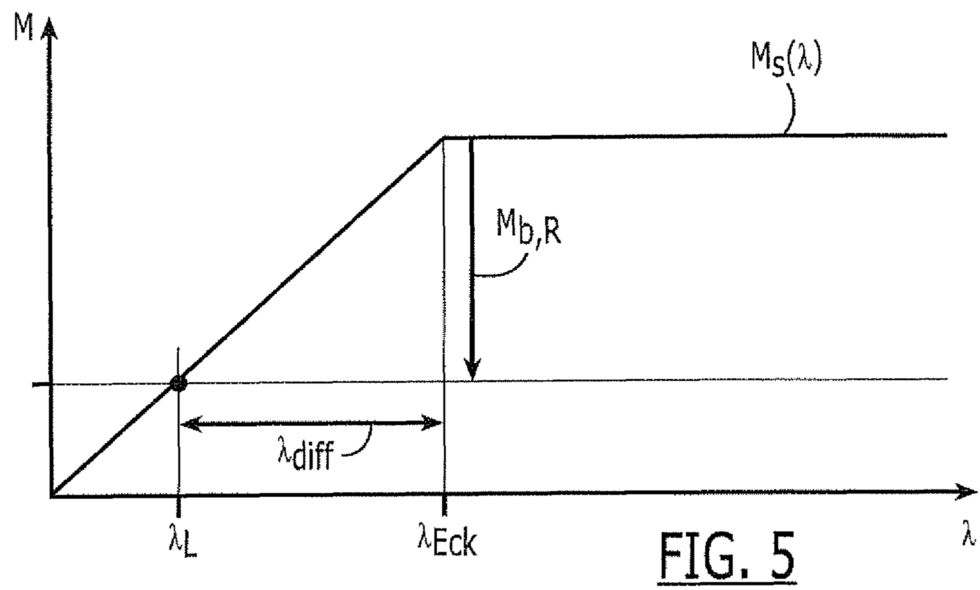

FIG. 5 shows a model of the M-slip curve illustrating how wheel slip $\lambda_L$ is determined.

Figure 6:
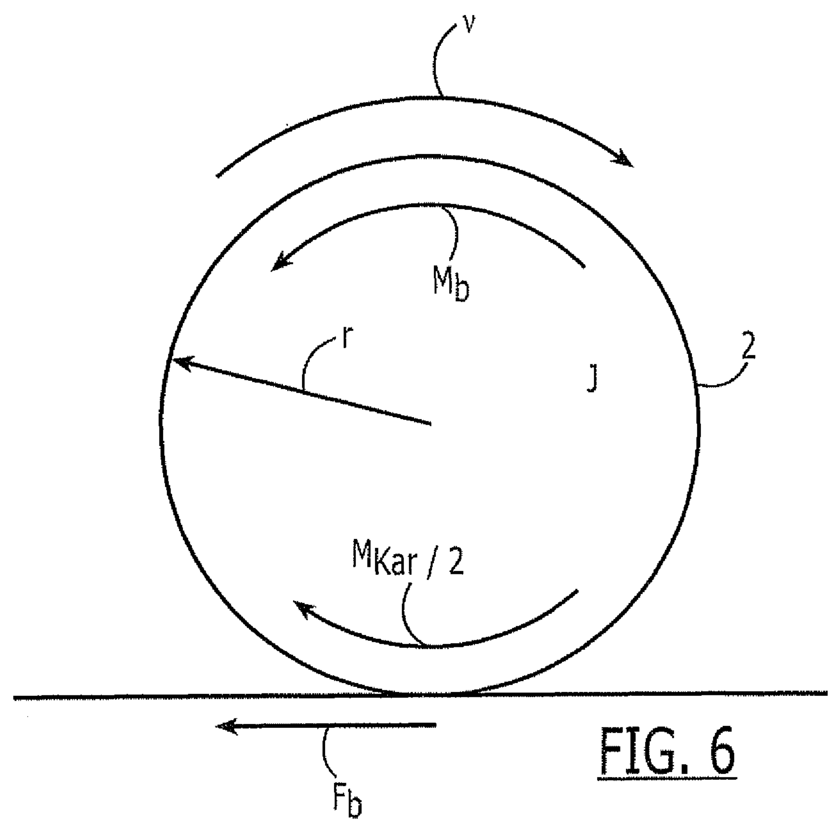

FIG. 6 shows the dynamic response of the rear wheels.

DETAILED DESCRIPTION OF EXAMPLE EMBODIMENTS

Figure 1:
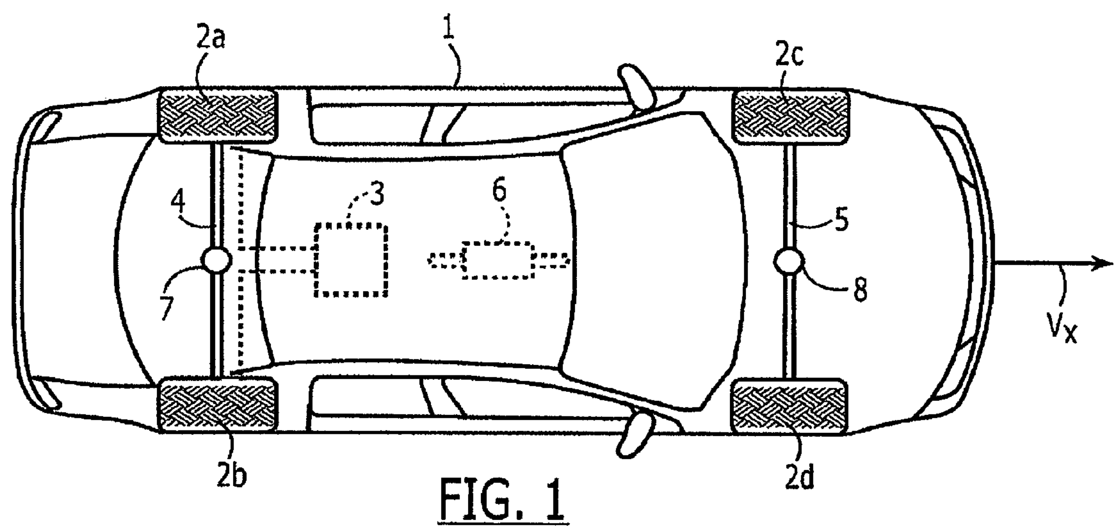
FIG. 1 shows a schematic view of a vehicle having all-wheel drive and including a system for determining the vehicle linear velocity.

FIG. 1 shows a schematic representation of a vehicle 1 having all-wheel drive, whose front and rear axle 4, 5 are coupled to one another via a center lock 6. Center lock 6 is situated in the Cardan shaft and may be implemented in the form of a claw or multidisk clutch, for example. On the front and rear axle there are individual axle-differential gearings 7 and 8, respectively. The wheels of the vehicle are denoted by 2*a*-2*d*.

Vehicle 1 is equipped with one or several vehicle controller(s) such as, e.g., ABS, ESP or TCS, which intervene in the driving operation in specific (critical) driving situations in order to stabilize the vehicle and to assist the driver. The corresponding algorithms are implemented in one or several control device(s) 3. The vehicle controllers usually require vehicle linear velocity $v_x$ as input variable for further calculations.

In this exemplary embodiment, wheels 2*a*, 2*b* of rear axle 4 are utilized to determine vehicle linear velocity $v_x$ and excluded from the ABS control.

In a driving situation in which the controller is active, a specific braking-force difference or pressure difference is first set at wheels 2*a*, 2*b* within the framework of this method. This causes one of the wheels to run slower and the other to run faster. In this context, the pressure difference is selected such that a discernible difference in speed comes about between the wheels yet the slower wheel does not lock. The rotational speed of the particular wheel (e.g., 2*a*) having the higher rotational speed thus comes close to the vehicle linear velocity.

To generate the desired braking-force difference, it is basically possible to reduce or increase the braking force at each individual wheel (2*a* or 2*b*). This process is controlled by control device 3 or the algorithm stored therein. Finally, using the rotational speed of the slightly braked or the unbraked (faster rotating) wheel, and the slip of this wheel as well as the braking-force difference, it is possible to determine vehicle velocity $v_x$, as will be elucidated in the following text.

Figure 2:
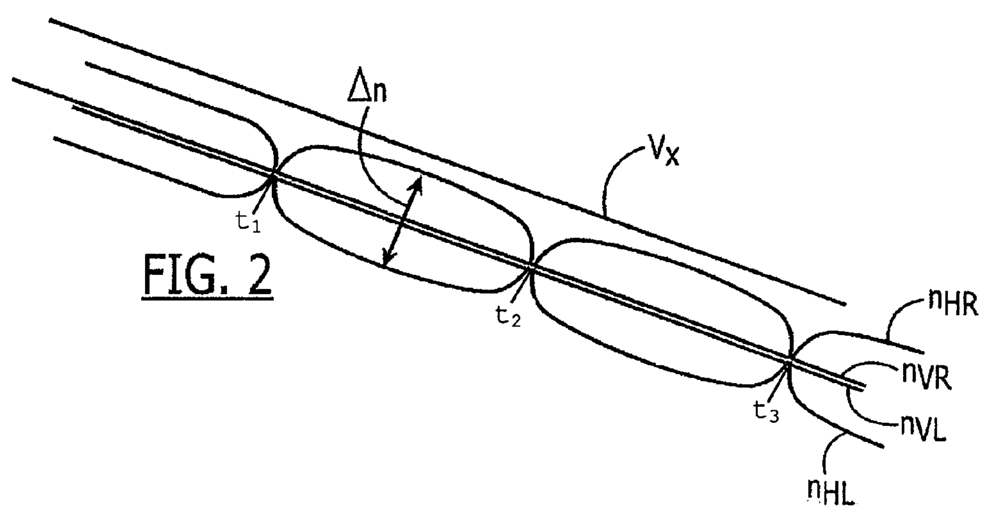
FIG. 2 shows the basic characteristic of the wheel speeds during an ABS braking operation.

FIG. 2 exemplarily illustrates the characteristic of the wheel speeds of all four wheels 2*a*-2*d* during an ABS braking operation based on a homogenous coefficient of friction. In this context, index VL denotes front left, VR front right, HL rear left, and HR rear right.

As can be gathered from the figure, the two wheels 2*c*, 2*d* of front axle 5 run at approximately (idealized) identical speed $n_{VL}$ and $n_{VR}$, respectively. In contrast, the two wheels 2*a*, 2*b* of the rear axle run at different rotational speeds $n_{HL}$ and $n_{HR}$ respectively, due to the different braking pressure. The deviation of the two rotational speeds is denoted by Δn.

At the beginning of the recording, left rear wheel 2*a* is running faster than right rear wheel 2*b*. A lower braking pressure is applied at left rear wheel 2*a* than at right rear wheel 2*b*. The braking-force difference causes a yawing moment about the vertical axis of the vehicle, which affects the driving response of the vehicle. To keep this yawing moment as low as possible, the operational sign of the pressure difference is reversed in each case at instants $t_1$, $t_2$ and $t_3$. This causes a reversal in the direction of the yawing moment. The yawing moment is therefore equal to zero on average over time.

Here, the vehicle linear velocity $v_x$ is calculated according to:

$$v_x = \frac{v}{1-\lambda}, \tag{1}$$

λ being the stationary wheel slip of the wheel having the greater speed, and v being the wheel speed. The following applies in connection with wheel speed v: v=2rπn, n being the wheel speed. The stationary state is the particular state in which equilibrium has come about and the slip of both wheels remains approximately constant.

Figure 3:
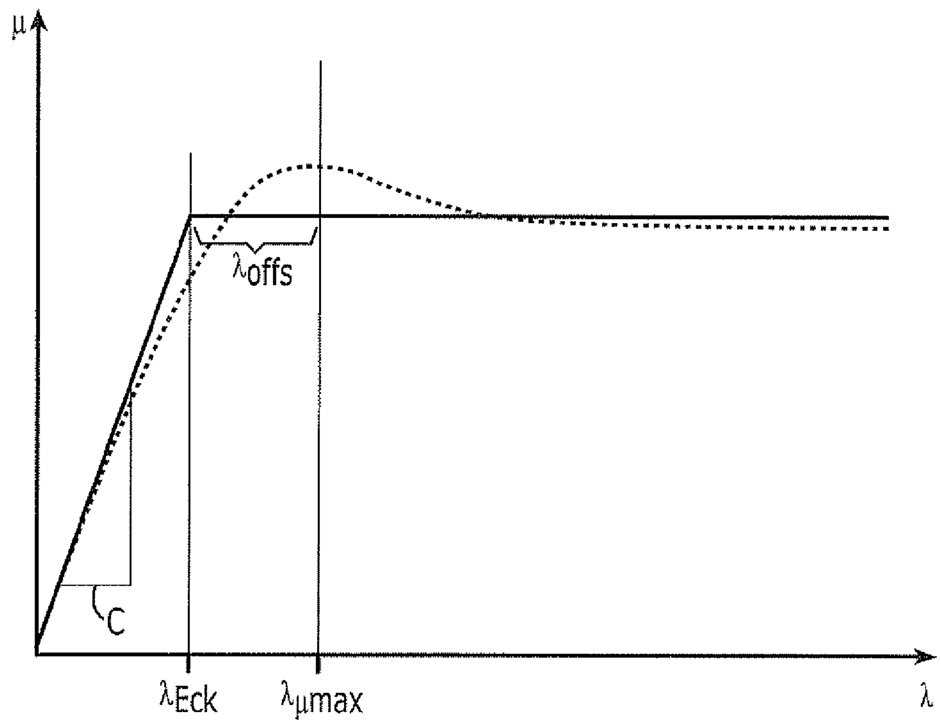

A simplified model of the p-slip curve as it is illustrated in FIG. 3 is used to determine the wheel slip. The simplified curve is basically made up of two straight lines that intersect in a corner. Slope C of the μ-slip curve at low slip values is assumed to be known. At higher slip values, the curve extends horizontally. The slip at the intersection of the straight line is denoted by $\lambda_{ECK}$. Real μ-slip curve is shown as dashed line.

If the vertical tire force is known, the μ-slip diagram is able to be converted into an M-slip diagram as it is shown in FIG. 4. In the following text, this diagram will be used since it is easier to illustrate the relationships graphically.

The method for determining the stationary slip λ is explained in the following text by an ABS braking operation based on a homogenous coefficient of friction (in this instance: homogenous ice) for a vehicle having four-wheel drive. In this case both wheels of the rear axle have the same M-slip curve, as shown in FIG. 4.

In the example of FIG. 4, the right wheel (index R) is braked to a relatively greater extent during the ABS control in order to relieve the other wheel (index L). The right wheel thus has greater slip $\lambda_R$ than the left wheel.

Wheel slip $\lambda$ is defined by $$\lambda = 1 - \frac{v}{v_x} \tag{2}$$

Consequently, the following applies in connection with the slip of the Cardan shaft at the input of differential gearing $\lambda_{Kar}$:

$$\lambda_{Kar}=0.5(\lambda_L+\lambda_R) \tag{3}$$

Because of (3), wheel slip $\lambda_L$ and $\lambda_R$ of the rear wheels is in mirror symmetry with the Cardan slip, as illustrated in FIG. 3.

The dynamic response of the rear wheels may be described with the aid of the angular momentum principle using FIG. 6:

$$\frac{J}{r}v_L = M_{S,L} - M_{b,L} + M_{Kar/2} \tag{4}$$

$$\frac{J}{r}v_R = M_{S,R} - M_{b,R} + M_{Kar/2} \tag{5}$$

In this context $M_s$ is the torque transmitted between tire and road due to the slip, $M_S=F_b$ r (FIG. 6) applying in this context.

$M_b$ the brake torque (e.g., of the hydraulic brake) at the wheel $M_{Kar/2}$ one half of the Cardan torque.

In the following text, the stationary state for the wheel slip on the left and right is to be calculated. The derivation of the wheel slip from (2) for the particular wheels amounts to $$\lambda_{L,R} = \frac{v_{L,R}}{v_x^2}v_x - \frac{1}{v_x}v_{L,R} \tag{6}$$

Thus, the following must apply for a stationary state ($\lambda$=0):

$$v_{L,R} = \frac{v_{L,R}}{v_x}v_x \tag{7}$$

Inserted in (4), (5), the result is $$\frac{J}{r}\frac{v_L}{v_x}v_x = M_{S,L} - M_{b,L} + M_{Kar/2} \tag{8}$$

$$\frac{J}{r}\frac{v_R}{v_x}v_x = M_{S,R} - M_{b,R} + M_{Kar/2} \tag{9}$$

If the difference (8)-(9) is formed, the result is $$\frac{Jv_x}{rv_x}(v_L - v_R) = M_{S,L} - M_{S,R} - (M_{b,L} - M_{b-R}) \tag{10}$$

or reformed $$\frac{Jv_x}{r}(\lambda_L - \lambda_R) = M_{S,L} - M_{S,R} - (M_{b,L} - M_{b,R}) \tag{11}$$

The left term in (11) is very small compared to the right term. As a result, the left side is disregarded and set to zero. (11) thus results in $$M_{S,L}-M_{b,L}=M_{S,R}-M_{b,R}=M_{GG} \tag{12}$$

In this context, $M_{GG}$ is to be the torque at which the wheel slip on the left and right remains constant. As mentioned, a brake torque $M_{b,R}$ is applied at the right rear wheel while no brake torque ($M_{b,L}$=0) is applied at the left wheel. An equilibrium of the wheel accelerations then results at: $M_{GG}=M_{S,R}-M_{b,R}$ as shown in FIG. 4.

In FIG. 5 it is illustrated how wheel slip $\lambda_L$ is determined. The following applies for distance $\lambda_{Diff}$ of wheel slip $\lambda_L$ with respect to corner $\lambda_{ECK}$ of the simplified characteristic curve:

$$\lambda_{Diff} = \frac{M_{b,R}}{C} \tag{13}$$

From a geometric consideration of FIGS. 3 and 5, the following results for $\lambda_L$:

$$\lambda_L = \lambda_{\mu MAX} - \lambda_{Offs} - \lambda_{Diff} = \lambda_{\mu MAX} - \lambda_{Offs} - \frac{M_{b,R}}{C}$$

The values of $\lambda_{\mu,max}$ and $\lambda_{Offs}$ (cf. F*ig*.3) characterize the maximum of the μ-slip curve or the distance (offset) of the maximum of slip $\mu_{Eck}$ and could be determined with the aid of tire characteristic maps, for example. The coefficient of friction of the road is able to be estimated from the sum of the braking forces of all four wheels. The tire characteristic maps are a function of the coefficient of friction between tire and road and known from measurements. They are preferably stored in a control device.

Finally, reference velocity $v_x$ may be calculated from slip $\lambda_L$ according to the equation (2), by:

$$v_x = \frac{v_L}{1 - \lambda_L}$$

With different coefficients of friction on the left and right side of the vehicle (what is referred to as μ-split), different μ-slip curves must be taken into account for the left and right wheel, and the adjusted pressure difference is to be adapted accordingly.

What is claimed is:

1. A method for determining a vehicle linear velocity of a vehicle having all-wheel drive and a vehicle controller, the method comprising:

adjusting a braking-pressure difference at two diametrically opposed wheels of an axle if an ABS or ASR controller is active; and at least one of (i) calculating, in the case of an ABS control, the vehicle linear velocity from a rotational speed of a wheel having a higher speed, and from a slip of the wheel having the higher speed, and (ii) calculating, in the case of an ASR control, the vehicle linear velocity from a rotational speed of a wheel having a lower speed, and from a slip of the wheel having the lower speed;

wherein the braking-pressure difference is selected such that a friction of a differential gearing is overcome.

2. The method as recited in claim 1, wherein the vehicle velocity is determined according to the following equation:

$$v_x = \frac{v}{1-\lambda},$$

and wherein v is the speed of the wheel having the higher speed in the case of ABS control or the wheel having the lower speed in the case of ASR control, and λ, being the slip of this wheel.

3. The method as recited in claim 1, wherein the slip is determined using real and simplified tire characteristic curves.

4. The method as recited in claim 1, wherein the axle is a rear axle.

5. The method as recited in claim 1, wherein one of a braking pressure and braking force is increased or decreased at one of the wheels in order to generate a braking-pressure difference.

6. A method for determining a vehicle linear velocity of a vehicle having all-wheel drive and a vehicle controller, the method comprising:

adjusting a braking-pressure difference at two diametrically opposed wheels of an axle if an ABS or ASR controller is active; and at least one of (i) calculating, in the case of an ABS control, the vehicle linear velocity from a rotational speed of a wheel having a higher speed, and from a slip of the wheel having the higher speed, and (ii) calculating, in the case of an ASR control, the vehicle linear velocity from a rotational speed of a wheel having a lower speed, and from a slip of the wheel having the lower speed;

wherein an operational sign of the braking-pressure difference is periodically reversed.

7. The method as recited in claim 6, wherein the vehicle velocity is determined according to the following equation:

$$v_x = \frac{v}{1-\lambda},$$

and wherein v is the speed of the wheel having the higher speed in the case of ABS control or the wheel having the lower speed in the case of ASR control, and λ being the slip of this wheel.

8. The method as recited in claim 6, wherein the slip is determined using real and simplified tire characteristic curves.

9. The method as recited in claim 6, wherein the axle is a rear axle.

10. The method as recited in claim 6, wherein one of a braking pressure and braking force is increased or decreased at one of the wheels in order to generate a braking-pressure difference.

11. A control device for a vehicle having all-wheel drive, comprising:

a control arrangement configured to adjust a braking-pressure at two diametrically opposed wheels of an axle, wherein:

the control device is configured to determine a vehicle linear velocity from a wheel having a higher speed and from a slip the wheel having the higher speed, in the case of ABS control, and to determine the vehicle linear velocity from a wheel having a lower speed and from a slip of the wheel having the lower speed, in the case of ASR control; and the braking-pressure difference is selected such that a friction of a differential gearing is overcome.

12. The device as recited in claim 11, wherein the vehicle velocity is determined according to the following equation:

$$v_x = \frac{v}{1-\lambda},$$

and wherein v is the speed of the wheel having the higher speed in the case of ABS control or the wheel having the lower speed in the case of ASR control, and λ being the slip of this wheel.

13. The device as recited in claim 11, wherein the axle is a rear axle.

14. The device as recited in claim 11, wherein one of a braking pressure and braking force is increased or decreased at one of the wheels in order to generate a braking-pressure difference.

15. The device as recited in claim 11, wherein an operational sign of the braking-pressure difference is periodically reversed.

16. The device as recited in claim 11, wherein the braking-pressure difference is regulated.

17. The device as recited in claim 11, wherein an operational sign of the braking-pressure difference is periodically reversed, and wherein the braking-pressure difference is regulated.

* * * * *